Aug. 30, 1966     J. W. HAWLEY     3,269,358
TIME OPERATED LABORATORY ANIMAL FEEDING AND HOUSING DEVICE
Filed Feb. 15, 1965
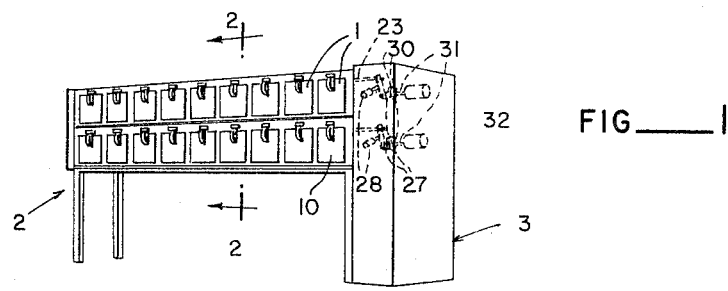
FIG___1
FIG___2
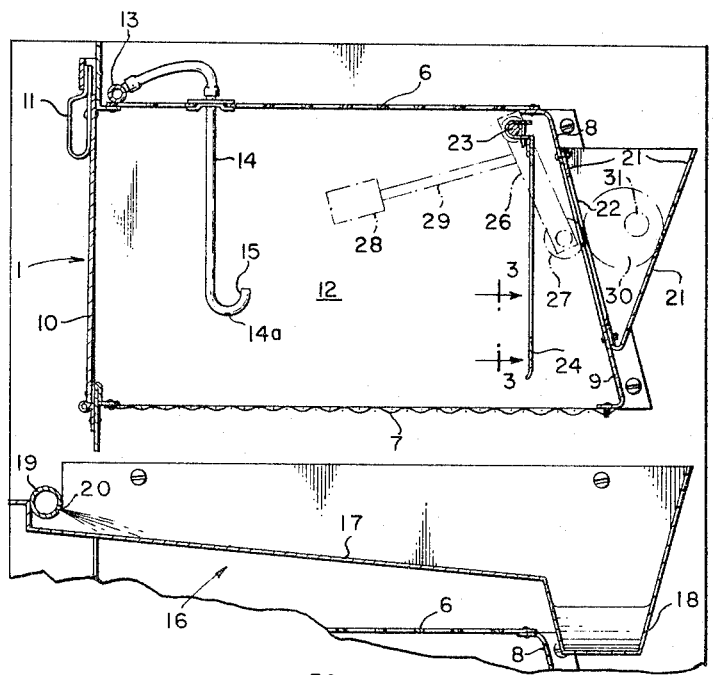
FIG___3
FIG___4
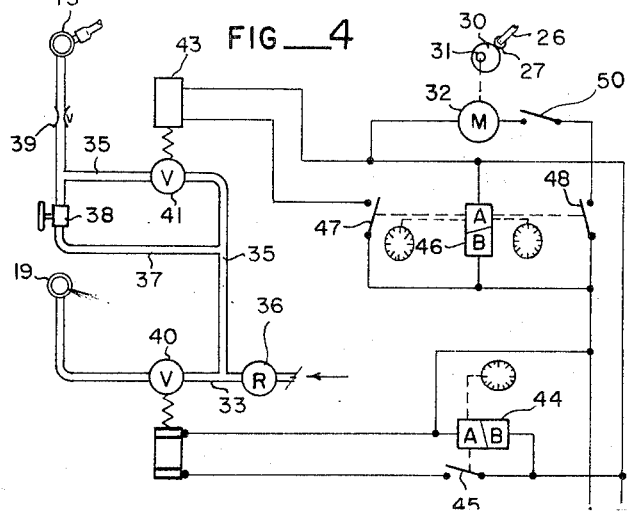
JAMES W. HAWLEY
*INVENTOR.*
BY Seed & Berry
ATTORNEYS United States Patent Office 3,269,358
Patented August 30, 1966

3,269,358
TIME OPERATED LABORATORY ANIMAL FEEDING AND HOUSING DEVICE
James W. Hawley, Seattle, Wash., assignor to Richard H. Clay, Bellevue, Wash.
Filed Feb. 15, 1965, Ser. No. 432,594
11 Claims. (Cl. 119—51.12)

The present invention relates to animal caging systems and more particularly to an automated caging system for housing large numbers of all types of laboratory animals, both large and small, such as rats, guinea pigs, dogs, cats, monkeys, birds and the like used for laboratory experimental purposes. According to the present invention, means are provided for housing, feeding, watering and waste removal of any number of experimental animals automatically and according to a programmed time schedule with a minimum of attention by an attendant or keeper. The present invention seeks to eliminate the need for personal attention on experimental projects involving large numbers of such animals and to maintain the animals in a sanitary and controlled environment during their use.

The primary object of the present invention, is therefore, to provide an animal housing system of the character described which is automated and adaptable for programming according to a preset schedule.

Another object of the present invention is to provide an animal housing system of the character described which is simple and foolproof in construction and operation and adaptable to the living habits of a wide variety of such animals.

Other more particular objects and advantages of the invention will, with the foregoing, appear and be understood from the following description and claims, the invention consisting in the novel construction and adaptation and combination of parts hereinafter described and claimed.

Reference is now made to the accompanying drawings in which:

FIG. 1 is a perspective view of a plurality of housing units according to the present invention;

FIG. 2 is a cross sectional view taken along lines 2—2 of FIG. 1;

FIG. 3 is an elevational detail taken along lines 3—3 of FIG. 2; and

FIG. 4 is an electrical schematic showing the controls for operation of the system.

Referring now to the drawings, wherein like reference numerals indicate identical parts in the various views, FIG. 1 illustrates a colony of animal housing units, according to the present invention, wherein rows of individual housing units 1 may be arranged in a plurality of tiers and supported by a suitable frame or the like 2 for convenience. Although only two tiers of housing units are illustrated in FIG. 1, it will be understood that the present invention is not limited to any specific number of units or tiers of units. A console 3 may be located at one end of the units for mounting the necessary motors and controls, as will be presently described.

FIG. 2 is a cross sectional view of one of the housing units 1 and a portion of the housing unit located directly below. Since all of the housing units are substantially identical in structure, the details of only one unit will be described and it will be understood that the description pertains to the remaining units of the system. The housing units are supported within the frame structure 2 which may be fabricated from sheet metal or the like and may be made integral, welded or otherwise connected in any conventional manner. Each individual housing unit is provided with a top wall 6 which may be provided with perforations for better ventilation and which may be supported at its front end on a suitable flange or bracket provided by the frame. The bottom or floor of the unit is constructed from a screen or the like 7 which is also supported at its forward end by brackets or a flange portion of the frame. The screen 7 should be chosen so as to provide for passage of droppings from the animal as will later be explained. The rear wall of the unit includes an upper transverse frame member 8 connected by bolting or the like to the frame structure and to the top wall 6 as shown in FIG. 2. A similar transverse frame member 9 is located at the bottom of the unit with the frame members 8 and 9 being disposed at an angle for the purpose of receiving a trough structure to be described. The frame members 8 and 9 are spaced to allow access to the trough. A hinged door 10 having a latch 11 provides access to the housing unit and sheet metal side walls 12 complete the wall structure of the unit.

Water is provided for each individual housing unit by means of a common conduit 13 which extends along the front wall of each row of units with all the conduits 13 being supplied from a single source as will be explained in connection with FIG. 4. The water supply pipe 14 extends from the conduit 13 and may pass through the top wall 6 of the unit and extend downwardly with an upwardly directed open end 15 being located at a level suitable for the type of animal being housed. The animal may drink directly from the open end of the supply pipe 14 during the times that water is supplied as will be explained, or the end of the pipe may be provided with a conventional enlarged or cup shaped end depending on the particular animal being watered. The water supply pipe 14 may also be provided with a weep hole 14a designed to drain the open end portion 15 when the water supply is shut off so as to closely control the time during which the animal may obtain water.

Mounted beneath each row of housing units 1 is a flush pan 16 which extends the entire length of the row of units and may be supported from the frame structure by means of bolting or the like as illustrated in FIG. 2. The flush pan 16 includes an inclined bottom wall 17 which directly underlies all of the housing units and which serves to catch the droppings which pass through the screen floor 7 of the unit. The inclined wall 17 is directed downwardly toward an elongated trough structure 18 which extends the length of the flush pan and may be inclined downwardly toward one end of the row of units so as to lead to a suitable drain, not shown. A common flush pipe 19 is located along the front edge of the flush pan 16 and it will be understood that each flush pan for each row of housing units is connected to a common water source with control means as will be described in connection with FIG. 4. The flush pipe 19 is provided with spaced orifices 20 for directing a plurality of small streams of water over the inclined wall 17 of the flush pan during such periods as will be determined by the control means shown in FIG. 4. The streams of water from the pipe 19 serve to remove the droppings from the inclined wall 17 by washing them downwardly toward the trough 18 and to a waste drain.

Considering now the feeding means provided by the present invention, reference is made to FIGS. 2 and 3. A common feed trough is provided on the back side of each of the housing units by means of longitudinally extending trough walls 21 which extend the length of the row of units and may be secured to the frame members 8 and 9 of the unit by bolts or the like as shown in FIG. 2. The V-shaped walls 21 form the actual feed trough, with a plurality of vertical elongated openings or slots 22 being provided in the trough wall facing the housing unit. Access to the slots 22 is provided by the spacing between the frame members 8 and 9. Extending longitudinally through all of the housing units in any given row is an actuator rod 23 which may be journaled in the frame in any conventional manner. Each housing unit is then provided with a feeding gate 24 which is fixed to and depending from the actuator rod 23 at its upper end so as to be rotated thereby. As shown in FIG. 3, the feeding gate 24 includes a plurality of vertically directed openings or slots 25 which are aligned with the slots 22 in the trough wall 21. It will also be noted that the slots 25 are of slightly larger dimensions than the slots 22 for a purpose to be described.

As shown in FIG. 2, the gate 24 is normally held in the vertical position and spaced from the trough wall so as to prevent the animal from reaching through the slots 25 and the slots 22 into the feed trough which contains food such as pelletized material commonly used to feed the animals. In the event that pellets are used, they will be of such a size relative to slots 22 so as to prevented from passing therethrough when grasped by the animal either with his mouth or his front legs. With this structure, it will be seen that when the gate 24 is in the vertical position shown in FIG. 2, the animal is prevented from reaching for food through the slots 22 and, when the gate 24 is moved toward the trough wall, the animal may reach through the slots 22 and 25 to nibble on the pellets which pass through the slots only when reduced in size thereby limiting the amount of food taken. Since the gate 24 is slightly spaced from the trough wall, constructing the slots 25 slightly larger than slots 22 insures the animal of being able to reach into the feed trough.

The means for moving the gate 24 comprises a lever arm 26 fixed to the end of the operating rod 23 which carries a roller member 27 on the opposite end thereof. A counter weight 28 may also be attached to the arm 26 by means of the arm 29. As illustrated in FIGS. 1 and 2, an eccentric 30 is fixed to a driven shaft 31 with the eccentric 30 being in contact with the roller 27. The operating rod 23 of each tier of units may be provided with its own lever arm 26, eccentric 30 and driven shaft 31. Each driven shaft 31 is driven by an electrical motor 32. As illustrated in FIG. 2, when the roller 27 contacts the high side of the eccentric 30, the gates 24 are in the vertical position and, when the eccentric 30 is rotated, the counter weight 28 causes the shaft 23 to rotate so as to bring the gates 24 closely adjacent to the trough wall. Thus, the only force tending to move the gate to the angled position is that of the counter weight 28 and the lever arm 29 with no positive mechanical linkage being involved. This arrangement eliminates any possibility of injury to an animal that may be caught between the moving gate and the trough wall and prevents jamming of the mechanism in case any solid object is caught.

Turning to the control system for the housing units, reference is made to FIG. 4 which shows a typical control system for a tier of housing units. As shown in FIG. 4, the flush pipe 19 is connected to a source of water pressure by means of the conduit 33. The water supply pipe 13 is connected to the conduit 33 by means of the conduit 35 with a pressure regulator 36 being located in the conduit 33 whereby the water pressure available in the supply pipe 13 and flush pipe 19 in each unit is controlled. A by-pass conduit 37 and a manual valve 38 are also provided for the conduit 13 with an adjustable throttle valve 39 being located between the conduit 35 and the pipe 13 to restrict the rate of flow of water from the end 15 of the supply pipe 14 to a trickle. Automatic control of the flush water from the pipe 19 and the drinking water from pipe 13 is accomplished by means of the electrically controlled valves 40 and 41 respectively. Since the valve 40 is subject to a high flow rate from the conduit 33 it is preferable to use an electrical heat actuated valve unit. The valve 40 may be any commercially available heat actuated valve unit which functions to close slowly so as to avoid any undesirable hammering in the water system which occurs from a rapidly operated valve such as a solenoid valve. The valve 41, on the other hand, may be a solenoid actuated valve controlled by the solenoid 43 since the throttle valve 39 reduces the flow rate. The electrical control circuit shown in FIG. 4 is used to accomplish the automatic control of valves 40 and 41.

A settable motor driven switching unit 44 is used to control the opening and closing of switch 45 so as to complete an electrical circuit to operate the valve unit 40 as illustrated. Thus the valve 40 remains closed until the switching unit 44 completes a circuit through the valve unit to open it to provide flush water through the conduit 19. The settable switching unit 44 may be set to close the switch 45 for a given length of time at periodic intervals, preferably intervals of 30 minutes, to remove the waste material from the housing unit. The switching unit 44 may be any conventional timing unit known to the art and suited to the purpose.

The solenoid 43 is energized and deenergized at periodic intervals by means of a second motor driven settable switching unit 46 which serves to close the switch 47 to complete a circuit through the solenoid 43 for opening the valve 41 to make the water available in the housing unit for a given period of time after which the switch is again opened. The switching unit 46 may also be any conventional timing unit known to the art and suited to the purpose. The switching unit 46 may be set to close the switch 47 for the given length of time at intervals of from one to twenty-four hours depending upon the schedule desired for the particular animals involved. The switching unit 46 is also used to control the switch 48 which completes a circuit through the motor 32 for driving the eccentric 30 to move the gates 24. The unit 46 will include separate settable means as illustrated for controlling the switch 47 in the same manner as described for switch 48. Thus food and water may be made available to the animals at the same or different periodic intervals determined by the settings of the switch unit 46. The manual override switch 50 is also provided for the motor 32 and must be in the closed position in order for the motor to operate. With the control system shown, the switching devices 44 and 46 may be preset for a given schedule of feeding, watering and waste removal and only a periodic check of the apparatus need be made by an attendant to see the apparatus is functioning properly and that a supply of food is available in the feed through. With this arrangement, exact uniformity in the daily deprivation schedule, for instance may be obtained for large numbers of animals without depending on the human factor, thereby producing better data both on long and short term studies as will be appreciated by those skilled in the art. Continuous and automatic flushing eliminates odor, permitting animals to be housed in the same area with the apparatus with which they are being used. The animals are thus more convenient to the experimenter and need not be moved from a housing unit to the experiment. The present device also eliminates congestion around cages in student laboratories and the like with the minimization of watering, feeding and cleaning chores.

From the foregoing description, it will be readily apparent to those skilled in the art that the present invention provides novel and useful improvements in laboratory animal housing devices and systems in the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. An animal housing device comprising; a plurality of adjacent housing units, a feed through having an inclined wall with a plurality of spaced vertical slots therein, means to mount said trough along the rear of said units with said inclined wall forming a portion of the rear walls of the units, an actuator rod extending through said units, a gate in each unit connected at its upper end to said rod, each gate including a plurality of vertical slots in alignment with the slots in said trough wall, and drive means for rotating said rod to move said gates toward said trough wall with the slots in the gates registering with the slots in the trough wall to provide access to said feed trough.

2. The device according to claim 1 wherein, the bottom walls of said units are constructed from perforated material or the like, and said device includes an inclined flush pan extending beneath said units with a common flush pipe having spray openings to clear waste material from said pan.

3. The device according to claim 2 including, a common water supply pipe extending through said units with water outlet means located in each unit, said outlet means being located at the same level and variable restrictor means in said supply pipe for obtaining a uniform limited flow of water from said outlets.

4. The device according to claim 3, including a first valve means for said flush pipe, a second valve means for said water supply pipe, an electrical control circuit, said circuit including a first and second valve actuator means for said first and said second valve means and electrical motor means for actuating said drive means, and settable switching means in said circuit for controlling the energization of said actuators and the energization of said motor, whereby the feeding, watering and waste removal may be carried out according to a predetermined schedule.

5. In combination; an animal housing unit having one inclined wall with means cooperating with said wall to form a feed through, said trough being provided with a plurality of vertical slots opening into said unit, a pivoted gate in said unit mounted adjacent said wall and adapted to swing toward and away from said wall, said gate including a plurality of vertical slots in alignment with the slots in said trough, motor means for swinging said gate toward said inclined wall with the slots in the gate registering with the slots in said trough, an inclined flush pan mounted beneath said unit, selectively operable flush water means mounted on said pan, water outlet means in said unit, and settable timing means for operating said motor and controlling the flow of water to said flush water means and said water outlet according to a predetermined schedule.

6. In combination with an animal housing unit having one inclined wall with means cooperating with said wall to form a feed trough, an automatic feeding apparatus comprising; a plurality of openings in said trough, a rotatable actuator rod mounted in said unit, a gate fixed to said rod and arranged to swing from a substantially vertical position to a position substantially parallel with and closely adjacent to said inclined wall, a plurality of openings in said gate, the openings in said gate being aligned with the openings in said trough, selectively operable drive means for rotating said rod, and settable timing means for energizing said drive means at selected intervals according to a predetermined schedule.

7. In combination with an animal housing unit having a fixed wall with means cooperating therewith to form a feeding trough, an automatic feeding apparatus comprising; access openings in said trough, a rotatable actuator rod mounted in said unit, and apertured feed access means connected to be actuated by said rod for permitting an animal in said housing unit to reach feed material within said trough through said access openings, selectively operable drive means for rotating said rod, and settable timing means for energizing said drive means at selected intervals according to a predetermined schedule.

8. In combination with an animal housing unit having an inclined wall with means cooperating therewith to form a feed trough, an automatic feeding apparatus comprising; a plurality of openings in said trough a pivoted gate in said unit mounted adjacent said wall and adapted to swing toward and away from said wall, said gate including openings therein in alignment with the openings in the trough, and selectively operable motor means for swinging said gate toward said inclined wall, whereby access is provided to said feed trough through said openings.

9. The combination according to claim 8 including, settable timing means for energizing said motor at selected intervals according to a predetermined schedule.

10. The combination according to claim 8 wherein, the bottom wall of said unit is constructed from perforated material or the like, and said combination includes an inclined flush pan extending beneath said unit with a flush pipe having spray openings to clear waste material from said pan.

11. The combination according to claim 10 including, a water supply pipe and outlet means located in said unit, and restrictor means in said supply pipe for limiting the flow of water from said outlet.

References Cited by the Examiner
UNITED STATES PATENTS

| | | | |
|---|---|---|---|
| 2,528,742 | 11/1950 | Coffing | 119—51.12 |
| 2,661,800 | 12/1953 | Reichenbach | 119—18 |
| 2,858,799 | 11/1958 | Krauss et al. | 119—5 |
| 3,180,321 | 4/1965 | Aldinger | 119—51 |

SAMUEL KOREN, *Primary Examiner.*

ALDRICH F. MEDBERY, *Examiner.*